(12) United States Patent
Ukon et al.

(10) Patent No.: US 9,599,193 B2
(45) Date of Patent: Mar. 21, 2017

(54) TRANSMISSION

(71) Applicant: Fuji Jukogyo Kabushiki Kaisha, Tokyo (JP)

(72) Inventors: Yasuyuki Ukon, Tokyo (JP); Keisuke Shibuya, Tokyo (JP)

(73) Assignee: FUJI JUKOGYO KABUSHIKI KAISHA, Tokyo (JP)

( * ) Notice: Subject to any disclaimer, the term of this patent is extended or adjusted under 35 U.S.C. 154(b) by 79 days.

(21) Appl. No.: 14/688,818

(22) Filed: Apr. 16, 2015

(65) Prior Publication Data

US 2015/0300454 A1 Oct. 22, 2015

Related U.S. Application Data

(63) Continuation of application No. 13/950,208, filed on Jul. 24, 2013, now Pat. No. 9,010,207.

(30) Foreign Application Priority Data

Aug. 8, 2012 (JP) .................................. 2012-176411

(51) Int. Cl.
*F16H 3/14* (2006.01)
*F16H 3/083* (2006.01)
(Continued)

(52) U.S. Cl.
CPC ............. *F16H 3/083* (2013.01); *F16D 7/028* (2013.01); *F16D 11/10* (2013.01); *F16D 21/04* (2013.01);
(Continued)

(58) Field of Classification Search
CPC . F16D 1/00; F16D 11/00; F16D 31/00; F16D 49/00
(Continued)

(56) References Cited

U.S. PATENT DOCUMENTS 2,593,629 A * 4/1952 Swift .................... F16H 37/046
475/207
5,281,190 A * 1/1994 Koivunen ........... F16D 25/0638
192/101
(Continued)

FOREIGN PATENT DOCUMENTS

JP 2009/536713 A 10/2009
JP 2010-510464 A 4/2010
(Continued)

OTHER PUBLICATIONS

U.S. Notice of Allowance dated Dec. 17, 2014 in co-pending U.S. Appl. No. 13/950,208.
(Continued)

*Primary Examiner* — William Kelleher
*Assistant Examiner* — Zakaria Elahmadi
(74) *Attorney, Agent, or Firm* — McGinn IP Law Group, PLLC

(57) ABSTRACT

A transmission includes an input shaft to receive a rotation of an engine, drive gears respectively attached to the input shaft to freely rotate individually, an output shaft disposed parallel to the input shaft in order to output rotation following a gear shift, driven gears respectively attached to the output shaft to freely rotate individually and to mesh with the drive gears, an engagement mechanism to fix a gear to be used in a gear shift individually, from among the drive gears, to the input shaft to be incapable of relative rotation, and a selector mechanism to fix, during the gear shift, the driven gear of a corresponding gear position individually, which meshes with the drive gear fixed to the input shaft by the engagement mechanism, to the output shaft to be incapable of relative rotation, and a hub that is fixed to the input shaft.

20 Claims, 12 Drawing Sheets

(51) Int. Cl.
*F16H 3/089* (2006.01)
*F16D 7/02* (2006.01)
*F16D 11/10* (2006.01)
*F16D 21/04* (2006.01)
*F16H 63/30* (2006.01)

(52) U.S. Cl.
CPC .............. *F16H 3/089* (2013.01); *F16H 63/30* (2013.01); *F16H 2063/3093* (2013.01); *F16H 2063/3096* (2013.01); *Y10T 74/1946* (2015.01); *Y10T 74/19219* (2015.01); *Y10T 74/19288* (2015.01)

(58) Field of Classification Search
USPC .......................... 74/371, 325, 342, 340, 369
See application file for complete search history.

(56) References Cited

U.S. PATENT DOCUMENTS

| | | | | |
|---|---|---|---|---|
| 5,761,961 A * | 6/1998 | Krauss | .................. | B60K 17/02 74/325 |
| 5,827,148 A * | 10/1998 | Seto | ....................... | B60L 11/18 477/15 |
| 6,209,407 B1 * | 4/2001 | Heinzel | ................. | F16H 3/006 74/331 |
| 6,364,042 B1 * | 4/2002 | Joachim | ................. | B60K 6/387 180/65.25 |
| 6,427,550 B1 * | 8/2002 | Bowen | .................... | F16H 3/006 74/331 |
| 6,460,425 B1 * | 10/2002 | Bowen | .................... | F16H 3/006 74/331 |
| 7,448,290 B2 * | 11/2008 | Gitt | ........................ | F16H 3/006 74/331 |
| 8,171,814 B2 | 5/2012 | Martin et al. | | |
| 8,291,784 B2 * | 10/2012 | Martin | .................... | F16D 11/10 74/329 |
| 8,424,405 B2 * | 4/2013 | Moore | ..................... | F16H 3/10 192/48.6 |
| 8,528,434 B2 * | 9/2013 | Nishimura | .............. | F16H 3/093 74/325 |
| 8,701,516 B2 * | 4/2014 | Toyoda | ................... | F16D 48/06 74/325 |
| 2006/0185456 A1 * | 8/2006 | Gerlofs | ................... | F16H 61/16 74/325 |
| 2007/0144288 A1 * | 6/2007 | Ozaki | ..................... | F16H 3/006 74/335 |
| 2009/0227419 A1 * | 9/2009 | Martin | .................. | B60W 10/02 477/84 |
| 2009/0255357 A1 * | 10/2009 | Martin | .................... | F16D 11/10 74/335 |
| 2009/0301241 A1 * | 12/2009 | Martin | .................... | F16H 3/089 74/335 |
| 2010/0234165 A1 * | 9/2010 | Bu | .......................... | F16D 43/10 475/271 |
| 2010/0257969 A1 * | 10/2010 | Martin | ..................... | F16D 3/02 74/374 |
| 2011/0239819 A1 * | 10/2011 | Shibahata | .............. | B60K 6/383 74/665 A |

FOREIGN PATENT DOCUMENTS

| | | |
|---|---|---|
| WO | WO 2007/132209 A2 | 11/2007 |
| WO | WO 2008/062192 A1 | 5/2008 |
| WO | WO 2012/000706 | 1/2012 |

OTHER PUBLICATIONS

U.S. Office Action dated Aug. 26, 2015 in co-pending U.S. Appl. No. 13/950,208.

U.S. Office Action dated Feb. 25, 2014 in co-pending U.S. Appl. No. 13/950,208.

* cited by examiner

TRANSMISSION

CROSS-REFERENCE TO RELATED APPLICATIONS

The present application is a Continuation Application of U.S. patent application Ser. No. 13/950,208, filed on Jul. 24, 2013, which is based on and claims priority from Japanese Patent Application No. 2012-176411, filed on Aug. 8, 2012, the entire contents of which are hereby incorporated by reference.

BACKGROUND OF THE INVENTION

1. Field of the Invention

The present invention relates mainly to transmissions for vehicles.

2. Description of the Related Art

Examples of a dog type transmission that performs gear shifts without disengaging a clutch provided between an engine and the transmission includes a transmission disclosed in Japanese Unexamined Patent Application Publication (Translation of PCT Application) (JP-T) No. 2009-536713 and a transmission disclosed in JP-T No. 2010-510464 The dog type transmission includes a low speed gear and a high speed gear that are attached to an output shaft so as to freely rotate, a hub fixed to the shaft between the low speed gear and the high speed gear, and a first key and a second key that are attached to the hub so as to move freely in an axial direction and rotate integrally therewith in a circumferential direction.

According to this transmission, when the first key and the second key are moved to the low speed gear by an actuator during acceleration, for example, the first key engages with a dog provided on a side face of the low speed gear such that power transmission between the low speed gear and the hub is realized by the first key alone. At this time, the second key is disengaged from the low speed gear and can therefore be moved to the high speed gear while power transmission via the first key is underway.

When the second key is moved to the high speed gear, the second key engages with a dog provided on a side face of the high speed gear such that power transmission between the high speed gear and the hub is realized by the second key. When a power transmission path is switched from the low speed gear to the high speed gear, a rotation speed of the shaft decreases, and therefore the engagement between the first key and the low speed gear is released at the same time as the switch in the power transmission path so that the first key can be switched to the high speed gear. By moving the first key to the high speed gear, a gear shift from the low speed gear to the high speed gear can be completed without causing torque interruption.

In the transmission described above, however, each of the keys is engaged with the corresponding gear in a condition where a rotation difference remains between the key and the gear, and therefore, when the key engages with the dog of the gear, torque variation (to be referred to hereafter as "spike torque") occurs in which the torque jumps momentarily and then returns to normal. When spike torque is generated during a gear shift in this manner, an impact sound is generated by the engagement between the key and the dog, noise is generated when an outer race of a bearing that supports the shaft impinges on a transmission case. Moreover, the spike torque generates torsion in the shaft, which causes vibration in a drive wheel and the transmission case.

It is known that when a key is engaged with a dog of a gear of a corresponding gear position during a gear shift, the spike torque described above increases in accordance with the number of gears that co-rotate with the gear of the corresponding gear position (i.e. rotary members related to the gear shift) and inertia therein. In a conventional transmission, drive gears attached to an input shaft and driven gears that are attached to an output shaft and mesh with the drive gears all co-rotate, and therefore the number of rotary members related to the gear shift and the inertia therein are large. As a result, large spike torque is generated during the gear shift.

SUMMARY OF THE INVENTION

The present invention has been designed in consideration of the circumstances described above, and an object thereof is to provide a transmission that reduces spike torque by minimizing the number of gears that co-rotate with a gear of a corresponding gear position and inertia therein during a gear shift.

An aspect of the present invention provides a transmission including: an input shaft to receive the rotation of an engine; drive gears attached to the input shaft so as to freely rotate; an output shaft disposed parallel to the input shaft in order to output rotation following a gear shift; driven gears that are attached to the output shaft so as to freely rotate and mesh with the drive gears; an engagement mechanism to fix a gear to be used in a gear shift, from among the drive gears, to the input shaft to be incapable of relative rotation; and a selector mechanism to fix, during the gear shift, the driven gear of a corresponding gear position, which meshes with the drive gear fixed to the input shaft by the engagement mechanism, to the output shaft to be incapable of relative rotation.

The engagement mechanism may include: a hub that is fixed to the input shaft between adjacent gears from among the drive gears attached to the input shaft so as to freely rotate; and a sleeve that is held by the hub so as to freely move in an axial direction of the input shaft, whereby the sleeve engages with one of the adjacent gears when moved to one side in the axial direction and engages with the other adjacent gear when moved to another side in the axial direction, and the drive gears may be arranged on the input shaft such that adjacent gears are separated by at least two gear positions.

The selector mechanism may include: dogs that project respectively from opposing surfaces of adjacent gears from among the driven gears attached to the output shaft so as to freely rotate; a hub fixed to the output shaft between the adjacent gears; a first key which is held on the hub so as to freely move in an axial direction of the output shaft, one end of which can be engaged with a leading surface of the dog projecting from one of the adjacent gears and another end of which can be engaged with a trailing surface of the dog projecting from the other adjacent gear; a second key which is held on the hub so as to freely move in the axial direction of the output shaft, one end of which can be engaged with the trailing surface of the dog projecting from one of the adjacent gears and another end of which can be engaged with the leading surface of the dog projecting from the other adjacent gear; and an actuator for moving the first key and the second key in the axial direction of the output shaft.

Another aspect of the present invention provides a transmission including: an input shaft to receive the rotation of an engine; drive gears attached to the input shaft so as to freely rotate; an output shaft disposed parallel to the input shaft in order to output the rotation following a gear shift; driven gears that are attached to the output shaft so as to freely rotate and mesh with the drive gears; an engagement mechanism to fix a gear to be used in a gear shift, from among the driven gears, to the output shaft to be incapable of relative rotation; and a selector mechanism to fix, during the gear shift, the drive gear of a corresponding gear position, which meshes with the driven gear fixed to the output shaft by the engagement mechanism, to the input shaft to be incapable of relative rotation.

The engagement mechanism may include: a hub that is fixed to the output shaft between adjacent gears from among the driven gears attached to the output shaft so as to freely rotate; and a sleeve that is held by the hub so as to freely move in an axial direction of the output shaft, whereby the sleeve engages with one of the adjacent gears when moved to one side in the axial direction and engages with the other adjacent gear when moved to another side in the axial direction, and the driven gears may be arranged on the output shaft such that adjacent gears are separated by at least two gear positions.

The selector mechanism may include: dogs that project respectively from opposing surfaces of adjacent gears from among the drive gears attached to the input shaft so as to freely rotate; a hub fixed to the input shaft between the adjacent gears; a first key which is held on the hub so as to freely move in an axial direction of the input shaft, one end of which can be engaged with a leading surface of the dog projecting from one of the adjacent gears and another end of which can be engaged with a trailing surface of the dog projecting from the other adjacent gear; a second key which is held on the hub so as to freely move in the axial direction of the input shaft, one end of which can be engaged with the trailing surface of the dog projecting from one of the adjacent gears and another end of which can be engaged with the leading surface of the dog projecting from the other adjacent gear; and an actuator for moving the first key and the second key in the axial direction of the input shaft.

Key grooves extending in the axial direction may be formed in an outer peripheral surface of the hub at intervals in a circumferential direction, and the first key and the second key may be held in the key grooves alternately in the circumferential direction.

The input shaft may be divided into a first input shaft on the engine side and a second input shaft to which the drive gears are attached so as to freely rotate, and a damping mechanism that causes the first input shaft and the second input shaft to rotate integrally when a torque generated in either one of the first input shaft and the second input shaft is smaller than a predetermined value and causes the first input shaft and the second input shaft to rotate relatively when the torque equals or exceeds the set torque may be interposed between the first input shaft and the second input shaft.

The damping mechanism may include: a first input shaft friction plate that rotates integrally with the first input shaft; a second input shaft friction plate that is disposed to overlap the first input shaft friction plate and rotates integrally with the second input shaft; and an elastic member for pressing the second input shaft friction plate against the first input shaft friction plate.

DESCRIPTION OF THE PREFERRED EMBODIMENTS

Preferred embodiments of the present invention will be described in detail below with reference to the attached drawings. Dimensions, materials, and other specific numerical values and the like indicated in the embodiments are merely examples for facilitating comprehension of the invention and, excluding specific cases to the contrary, are not intended to limit the present invention. Note that elements having substantially identical functions and configurations have been allocated identical reference symbols in the specification and drawings, and duplicate description thereof has been omitted. Further, elements not directly related to the present invention have been omitted from the drawings.

(Input Shaft 1 and Output Shaft 2)

Figure 1:
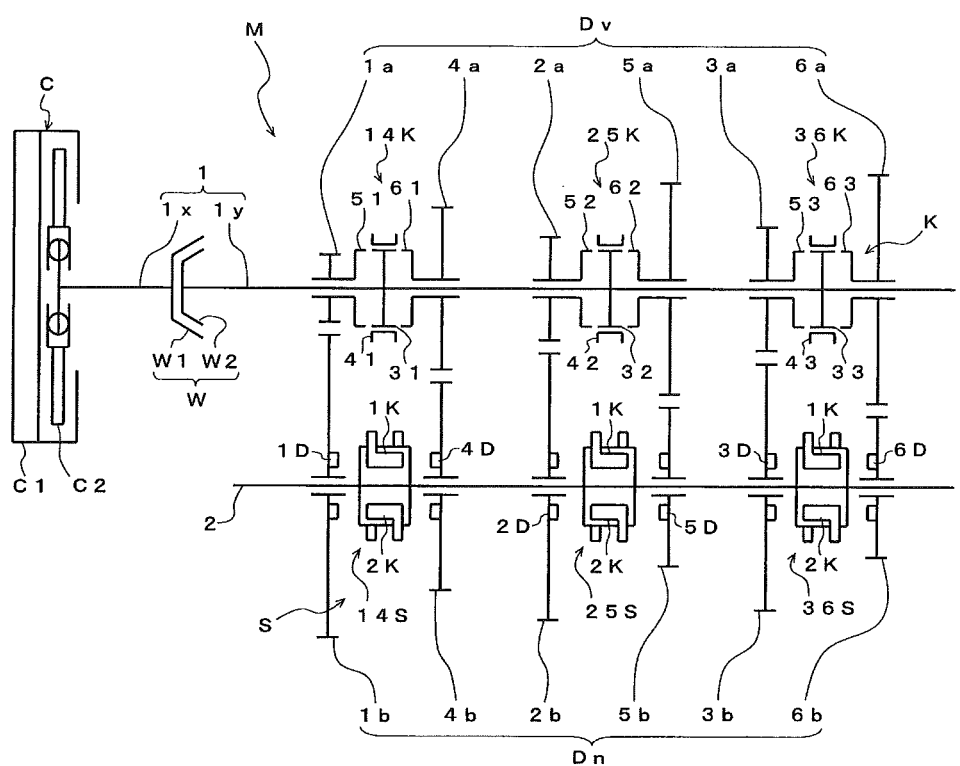
FIG. 1 is a schematic diagram of a transmission for a vehicle according to a first embodiment of the present invention.

FIG. 1 schematically shows a transmission M for a vehicle according to a first embodiment of the present invention. The transmission M according to this embodiment includes an input shaft 1 to receive the rotation of an engine, and an output shaft 2 disposed parallel to the input shaft 1. The input shaft 1 and the output shaft 2 are supported on a transmission case of the transmission M so as to be freely rotate via respective bearings. As will be described in detail below, the input shaft 1 is divided in an axial direction into a first input shaft 1x and a second input shaft 1y, between which a damping mechanism W is interposed.

The first input shaft 1x has a startup clutch C on an end thereof. The clutch C includes a drive plate C1 connected to a rotary shaft (a crankshaft) of the engine and a driven plate C2 connected to the input shaft 1. When the vehicle (automobile) is to be started, the clutch C has a function for starting the vehicle from a condition in which the transmission M is set in a startup gear position (the first gear, for example) by transmitting rotation of the crankshaft to the first input shaft 1x while the drive plate C1 and the driven plate C2 are in close contact. The output shaft 2 outputs rotation following a gear shift, and is connected to a drive wheel of the vehicle.

(Drive Gears Dv)

As shown in FIG. 1, the transmission M includes drive gears Dv attached to the second input shaft 1y so as to freely rotate. In this embodiment, the drive gears Dv are a first speed drive gear 1a, a second speed drive gear 2a, a third speed drive gear 3a, a fourth speed drive gear 4a, a fifth speed drive gear 5a, and a sixth speed drive gear 6a, which are respectively attached to the second input shaft 1y so to freely rotate. The number of teeth provided on each drive gear Dv increases in the order from a low speed gear to a high speed gear. Note that the number of drive gears Dv is not limited to six as long as at least two drive gears are provided. The drive gears Dv are arranged in order of the first speed drive gear 1a, the fourth speed drive gear 4a, the second speed drive gear 2a, the fifth speed drive gear 5a, the third speed drive gear 3a, and the sixth speed drive gear 6a from the startup clutch C side to an opposite side to the clutch C. Thus, the drive gears Dv are disposed such that adjacent gears are separated by at least two gear positions.

(Driven Gears Dn)

As shown in FIG. 1, the transmission M includes driven gears Dn that are attached to the output shaft 2 such that they freely rotate so as to mesh with the drive gears Dv. The driven gears Dn are a first speed driven gear 1b, a second speed driven gear 2b, a third speed driven gear 3b, a fourth speed driven gear 4b, a fifth speed driven gear 5b, and a sixth speed driven gear 6b, which mesh respectively with the first speed drive gear 1a, the second speed drive gear 2a, the third speed drive gear 3a, the fourth speed drive gear 4a, the fifth speed drive gear 5a, and the sixth speed drive gear 6a. The number of teeth provided on each driven gear Dn decreases in the order from a lower speed gear to a high speed gear. Similarly to the drive gears Dv, the driven gears Dn are arranged in order of the first speed driven gear 1b, the fourth speed driven gear 4b, the second speed driven gear 2b, the fifth speed driven gear 5b, the third speed driven gear 3b, and the sixth speed driven gear 6b from the startup clutch C side to the opposite side to the clutch C. Thus, the driven gears Dn are disposed such that adjacent gears are separated by at least two gear positions.

(Engagement Mechanism K)

As shown in FIG. 1, the transmission M includes an engagement mechanism K for fixing a gear to be used in a gear shift, from among the drive gears Dv, which are the first speed drive gear 1a, second speed drive gear 2a, third speed drive gear 3a, fourth speed drive gear 4a, fifth speed drive gear 5a, and sixth speed drive gear 6a, to the second input shaft 1y to be incapable of relative rotation prior to the gear shift. The engagement mechanism K has a first and fourth gear engagement mechanism 14K provided between the first speed drive gear 1a and the fourth speed drive gear 4a to fix either one of the first speed drive gear 1a and the fourth speed drive gear 4a to the second input shaft 1y to be incapable of relative rotation, a second and fifth gear engagement mechanism 25K provided between the second speed drive gear 2a and the fifth speed drive gear 5a to fix either one of the second speed drive gear 2a and the fifth speed drive gear 5a to the second input shaft 1y, and a third and sixth gear engagement mechanism 36K provided between the third speed drive gear 3a and the sixth speed drive gear 6a to fix either one of the third speed drive gear 3a and the sixth speed drive gear 6a to the second input shaft 1y.

The first and fourth gear engagement mechanism 14K includes a hub 31 fixed to the second input shaft 1y between the first speed drive gear 1a and the fourth speed drive gear 4a to be incapable of relative rotation, and a sleeve 41 that is held by the hub 31 so as to freely move in an axial direction of the second input shaft 1y. An engagement groove with which a shift fork, not shown in the drawing, engages is formed in an outer peripheral surface of the sleeve 41 in a circumferential direction. The shift fork is moved parallel to the axial direction of the input shaft 1 by an actuator (an electric cylinder or the like), not shown in the drawing.

When the sleeve 41 is moved to the first speed drive gear 1a side in the axial direction, the sleeve 41 engages with a hub 51 attached to the first speed drive gear 1a to be incapable of relative rotation such that the sleeve 41 is suspended between the hub 31 of the second input shaft 1y and the hub 51 of the first speed drive gear 1a. As a result, the first speed drive gear 1a is fixed to the second input shaft 1y to be incapable of relative rotation. When the sleeve 41 is moved to the fourth speed drive gear 4a side in the axial direction, on the other hand, the sleeve 41 engages with a hub 61 attached to the fourth speed drive gear 4a to be incapable of relative rotation such that the sleeve 41 is suspended between the hub 31 of the input shaft 1 and the hub 61 of the fourth speed drive gear 4a. As a result, the fourth speed drive gear 4a is fixed to the second input shaft 1y to be incapable of relative rotation. Synchromesh mechanisms (synchronization mechanisms) are provided respectively between the sleeve 41 and the hub 51 of the first speed drive gear 1a and between the sleeve 41 and the hub 61 of the fourth speed drive gear 4a.

Further, when the sleeve 41 is moved to an intermediate position (a neutral position) between the first speed drive gear 1a and the fourth speed drive gear 4a, the sleeve 41 engages only with the hub 31 of the second input shaft 1y, and not with the hub 51 of the first speed drive gear 1a and the hub 61 of the fourth speed drive gear 4a. As a result, the first speed drive gear 1a and the fourth speed drive gear 4a respectively freely rotate relative to the second input shaft 1y (i.e. enter a neutral condition).

The first and fourth gear engagement mechanism 14K was described above, but the second and fifth gear engagement mechanism 25K and the third and sixth gear engagement mechanism 36K are configured similarly to the first and fourth gear engagement mechanism 14K, and therefore description of the second and fifth gear engagement mechanism 25K and the third and sixth gear engagement mechanism 36K has been omitted. Note that in the second and fifth gear engagement mechanism 25K, a hub of the second speed drive gear 2a is denoted by 52, a hub of the fifth speed drive gear 5a is denoted by 62, and the hub and the sleeve of the input shaft 1 are denoted by 32 and 42, respectively. Further, in the third and sixth gear engagement mechanism 36K, a hub of the third speed drive gear 3a is denoted by 53, a hub of the sixth speed drive gear 6a is denoted by 63, and the hub and the sleeve of the input shaft 1 are denoted by 33 and 43, respectively.

(Selector Mechanism S)

As shown in FIG. 1, the transmission M includes a selector mechanism S for fixing the driven gear Dn in a corresponding gear position, which meshes with the drive gear Dv fixed to the second input shaft 1y by the engagement mechanism K, to the output shaft 2 to be incapable of relative rotation during a gear shift. The selector mechanism S is constituted by a first and fourth gear selector mechanism 14S for fixing either one of the first speed driven gear 1b and the fourth speed driven gear 4b to the output shaft 2 to be incapable of relative rotation, a second and fifth gear selector mechanism 25S for fixing either one of the second speed driven gear 2b and the fifth speed driven gear 5b to the output shaft 2, and a third and sixth gear selector mechanism 36S for fixing either one of the third speed driven gear 3b and the sixth speed driven gear 6b to the output shaft 2. The first and fourth gear selector mechanism 14S, the second and fifth gear selector mechanism 25S, and the third and sixth gear selector mechanism 36S are all configured similarly, and therefore only the first and fourth gear selector mechanism 14S will be described.

(Dogs 1D and 4D)

Figure 2:
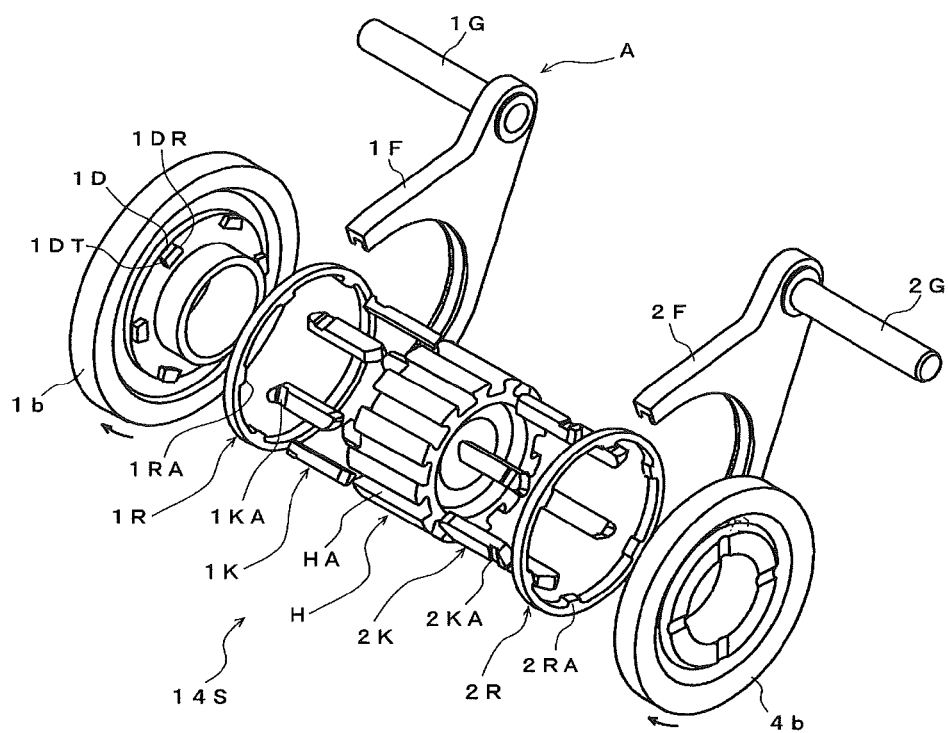
FIG. 2 is an exploded perspective view showing a selector mechanism (a first and fourth gear selector mechanism) of the transmission.
Figure 3:
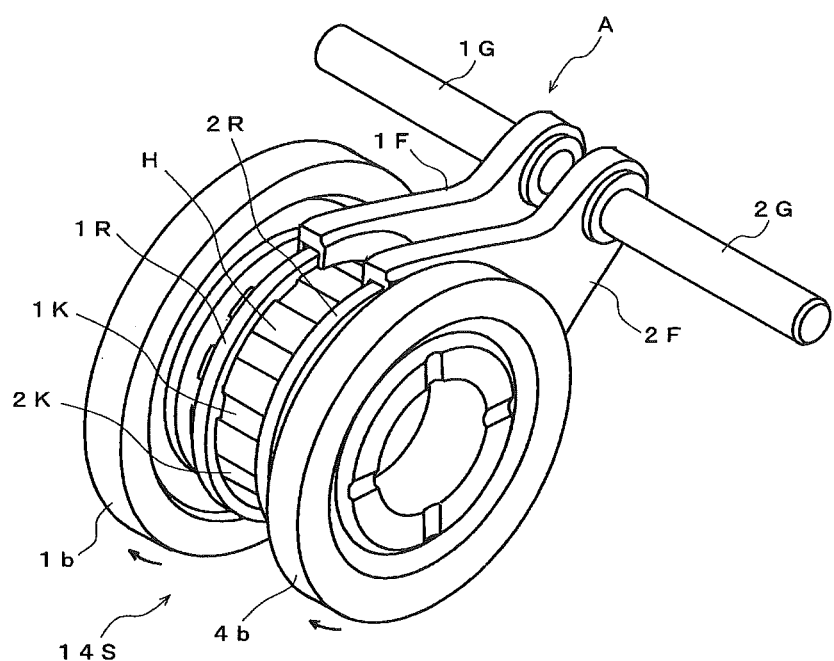
FIG. 3 is a perspective assembly drawing of the first and fourth gear selector mechanism.
Figure 4A:
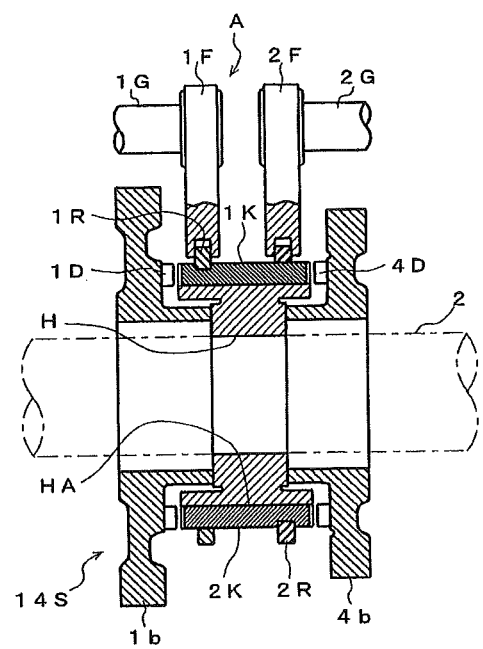
FIG. 4A is a sectional view of the first and fourth gear selector mechanism.
Figure 4B:
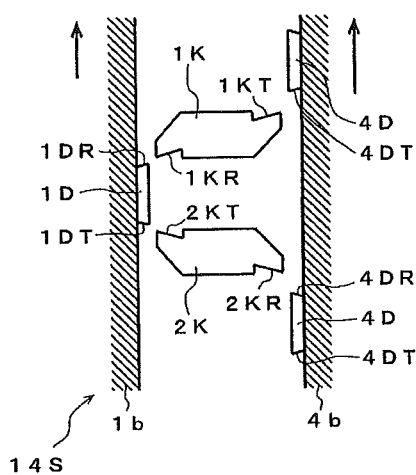
FIG. 4B is an illustrative view showing a dog, a first key, and a second key of the first and fourth gear selector mechanism.

FIG. 2 is an exploded perspective view showing the first and fourth gear selector mechanism 14S of the transmission M. FIG. 3 is a perspective assembly drawing of the first and fourth gear selector mechanism 14S. FIG. 4A is a sectional view of the first and fourth gear selector mechanism 14S. FIG. 4B is an illustrative view showing dogs 1D and 4D, a first key 1K, and a second key 2K of the first and fourth gear selector mechanism 14S. The first and fourth gear selector mechanism 14S includes the dogs 1D and 4D that project respectively from opposing surfaces of the first speed driven gear 1b and the fourth speed driven gear 4b. The dogs 1D and 4D are provided in respective pluralities at equal intervals in circumferential directions of the respective gears 1b and 4b. The dogs 1D and 4D respectively include leading surfaces (drive gear surfaces) 1DR and 4DR each serving as a front surface in rotation directions of the corresponding gear 1b or 4b, and trailing surfaces (driven gear surfaces) 1DT and 4DT each serving as a rear surface in the rotation directions. The leading surfaces 1DR and 4DR and the trailing surfaces 1DT and 4DT are formed in an inverse tapered shape so as to fan out from a base toward a tip end.

(Hub H)

As shown in FIG. 2, the first and fourth gear selector mechanism 14S includes a hub H that is fixed to the output shaft 2 between the first speed driven gear 1b and the fourth speed driven gear 4b. Key grooves HA formed parallel to the axial direction of the output shaft 2 are provided in an outer peripheral surface of the hub H at equal intervals in the circumferential direction. The first key 1K and the second key 2K are held in the key grooves HA so as to freely move in the axial direction. The first key 1K and the second key 2K are held in the respective key grooves HA alternately in the circumferential direction. Each key groove HA is formed such that an opening thereof is narrower than a bottom. Thus, when the hub H rotates such that centrifugal force is exerted on the first key 1K and the second key 2K, the first key 1K and the second key 2K do not fly out of the openings of the key grooves HA.

(First Key 1K and Second Key 2K)

As described above, the first and fourth gear selector mechanism 14S includes the first key 1K and the second key 2K held in the key grooves HA so to freely move in the axial direction. As shown in FIG. 4B, the first key 1K has, on an end thereof, an engagement pawl 1KR that engages with the leading surface 1DR of the dog 1D of the first speed driven gear 1b, and, on another end, an engagement pawl 1KT that engages with the trailing surface 4DT of the dog 4D of the fourth speed driven gear 4b. Similarly, the second key 2K has, on an end thereof, an engagement pawl 2KT that engages with the trailing surface 1DT of the dog 1D of the first speed driven gear 1b, and, on another end, an engagement pawl 2KR that engages with the leading surface 4DR of the dog 4D of the fourth speed driven gear 4b. The engagement pawls 1KR, 1KT, 2KR and 2KT are formed in an inverse tapered shape in order to improve an engagement performance of the engagement pawls 1KR, 1KT, 2KR and 2KT.

A first sleeve ring 1R and a second sleeve ring 2R are attached to the outer peripheral surface of the hub H so as to freely move in the axial direction but incapable of relative rotation in the circumferential direction relative to the hub H. As shown in FIG. 2, projections 1RA are provided on an inner peripheral surface of the first sleeve ring 1R at equal intervals in the circumferential direction, and the projections 1RA engage with recesses 1KA formed in the first key 1K. As a result, the first sleeve ring 1R and the first key 1K move integrally in the axial direction. Similarly, projections 2RA are provided on an inner peripheral surface of the second sleeve ring 2R at equal intervals in the circumferential direction, and the projections 2RA engage with recesses 2KA formed in the second key 2K. As a result, the second sleeve ring 2R and the second key 2K move integrally in the axial direction.

(Actuator A)

The first and fourth gear selector mechanism 14S includes an actuator A for moving the first key 1K and the second key 2K in the axial direction. The actuator A includes a first shift fork 1F that engages with the first sleeve ring 1R, a first shift rod 1G connected to the first shift fork 1F, and a first driving mechanism (an electric cylinder or the like), not shown in the drawings, that moves the first shift rod 1G in the axial direction. Further, the actuator A includes a second shift fork 2F that engages with the second sleeve ring 2R, a second shift rod 2G connected to the second shift fork 2F, and a second driving mechanism (an electric cylinder or the like), not shown in the drawings, that moves the second shift rod 2G in the axial direction. The first driving mechanism and the second driving mechanism perform gear shifts by moving the first shift rod 1G and the second shift rod 2G in a coordinated fashion in response to computer control corresponding to travel conditions of the vehicle or a shift operation performed on a shift lever or the like by a driver. The gear shifts, which will be described below, can be performed without torque interruption while the startup clutch C remains connected.

(Second and Fifth Gear Selector Mechanism 25S, Third and Sixth Gear Selector Mechanism 36S)

The second and fifth gear selector mechanism 25S and the third and sixth gear selector mechanism 36S shown in FIG. 1 are configured similarly to the first and gear speed selector mechanism 14S, and therefore description thereof has been omitted. Note that a dog of the second speed driven gear 2b is denoted by 2D, a dog of the third speed driven gear 3b is denoted by 3D, a dog of the fifth speed driven gear 5b is denoted by 5D, and a dog of the sixth speed driven gear 6b is denoted by 6D. Gear shifts at respective gears using the second and fifth gear selector mechanism 25S and the third and sixth gear selector mechanism 36S, which will be described below, can likewise be performed without torque interruption while the startup clutch C remains connected.

(Damping Mechanism W)

As shown in FIG. 1, in the transmission M according to this embodiment, the input shaft 1 is divided in the axial direction into the first input shaft 1x on the engine side (the clutch C side) and the second input shaft 1y on the opposite side to the clutch C. The clutch C is provided on one end of the first input shaft 1x, and the drive gears Dv (the first speed drive gear 1a, second speed drive gear 2a, third speed drive gear 3a, fourth speed drive gear 4a, fifth speed drive gear 5a, and sixth speed drive gear 6a) are respectively attached to the second input shaft 1y so as to freely rotate. The damping mechanism W is interposed between the first input shaft 1x and the second input shaft 1y.

The damping mechanism W absorbs an impact (spike torque) generated when one of the first speed driven gear 1b, the second speed driven gear 2b, the third speed driven gear 3b, the fourth speed driven gear 4b, the fifth speed driven gear 5b, and the sixth speed driven gear 6b is fixed to the output shaft 2 to be incapable of relative rotation by the selector mechanism S (the first and fourth gear selector mechanism 14S, the second and fifth gear selector mechanism 25S, or the third and sixth gear selector mechanism 36S). The damping mechanism W has a function for causing the first input shaft 1x and the second input shaft 1y to rotate integrally when torque generated in the first input shaft 1x or the second input shaft 1y is smaller than a predetermined value, and causing the first input shaft 1x and the second input shaft 1y to rotate relatively when the torque equals or exceeds the set torque.

The predetermined torque, which serves as a threshold for permitting relative rotation between the first input shaft 1x and the second input shaft 1y, or in other words slippage, is set to be larger than a maximum torque that can be generated in the first input shaft 1x and the second input shaft 1y when the first input shaft 1x is rotated by the engine so as to cause the vehicle to travel. Further, the predetermined torque is set to be smaller than the spike torque that can be generated in the first input shaft 1x and the second input shaft 1y when gear shifts are performed without torque interruption by the respective selector mechanisms 14S, 25S and 36S. In so doing, normal vehicle travel using the engine can be performed without impairment, and the spike torque generated during a gear shift can be dampened. The predetermined torque is set at a larger value than the aforesaid maximum torque so as to have a certain degree of leeway relative thereto. However, the leeway is preferably as small as possible. The predetermined torque is set thus so that minor spike torque slightly exceeding the maximum torque can be dampened accurately.

Figure 5:
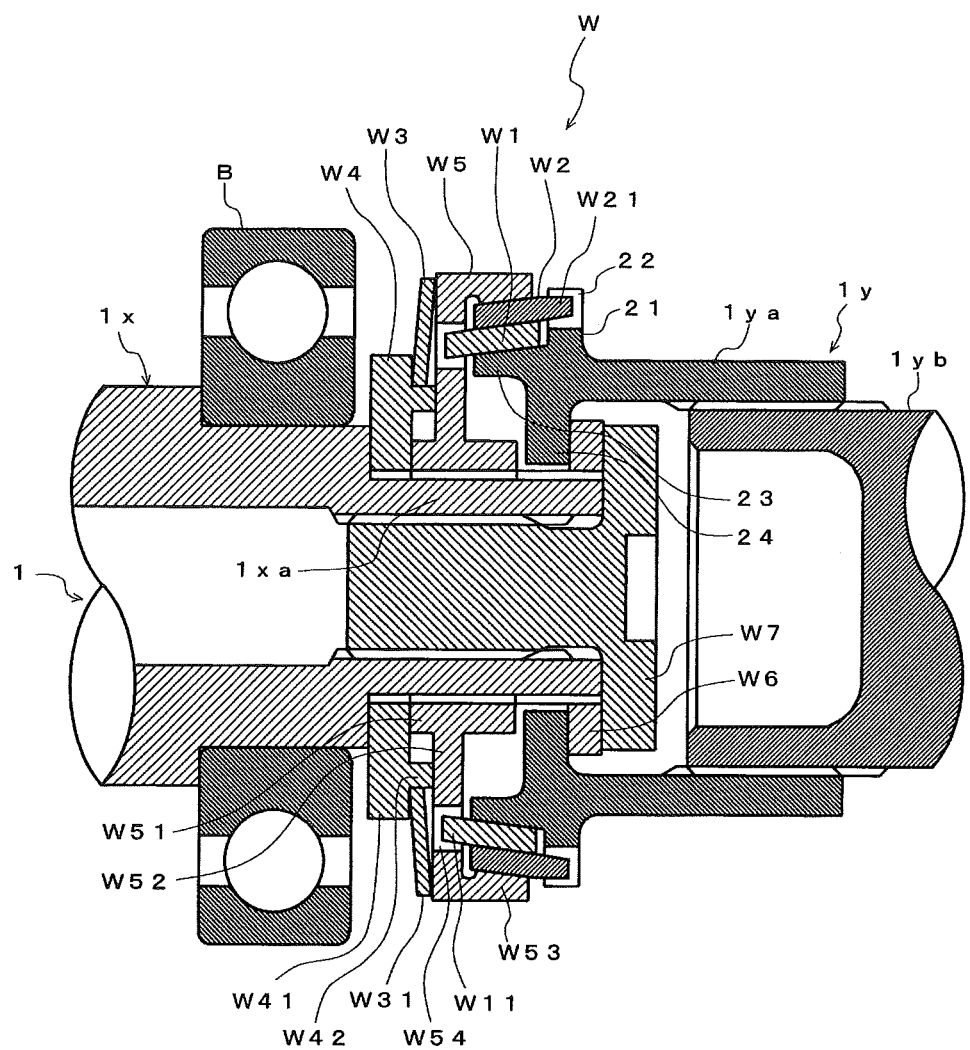
FIG. 5 is a sectional view showing a damping mechanism of the transmission.

FIG. 5 is a sectional view showing the damping mechanism W of the transmission M. The damping mechanism W includes a first input shaft friction plate (an inner ring) W1 that rotates integrally with the first input shaft 1x, a second input shaft friction plate (an outer ring) W2 that is disposed to overlap the first input shaft friction plate W1 and rotates integrally with the second input shaft 1y, and an elastic member W3 for pressing the second input shaft friction plate W2 against the first input shaft friction plate W1. The first input shaft ix is supported axially on the transmission case by a bearing B, and includes a small diameter shaft 1xa. The small diameter shaft 1xa of the first input shaft 1x is inserted into a hollow shaft end 1ya of the second input shaft 1y. The second input shaft 1y includes the hollow shaft end 1ya, and a shaft main body 1yb that is engaged to an inner peripheral surface of the shaft end 1ya via a spline. The drive gears 1a, 2a, 3a, 4a, 5a, 6a are respectively attached to the shaft main body 1yb so as to freely rotate.

A spline is formed on an outer peripheral surface of the small diameter shaft 1xa of the first input shaft 1x, and a retainer W4 and a hub W5 are attached thereto to be incapable of relative rotation. The retainer W4 includes a ring plate-shaped retainer main body W41 attached to the small diameter shaft 1xa, and a spring holder W42 projecting from a second input shaft side surface of the retainer main body W41. A conical plate spring W31 constituting the elastic member W3 is attached to the spring holder W42. The hub W5 includes a tubular W51 attached to the small diameter shaft 1xa of the first input shaft 1x, a ring plate-shaped hub main body W52 provided on the tubular W51, and a tubular friction surface W53 extending to an opposite side to the plate spring W31 from an outer peripheral end of the hub main body W52. An incline angle of an inner peripheral surface of the friction surface W53 matches an incline angle of an outer peripheral surface of the second input shaft friction plate W2 such that the inner peripheral surface of the friction surface W53 contacts the outer peripheral surface of the second input shaft friction plate W2 substantially evenly. Holding holes W54 are formed in the hub main body W52 at intervals in the circumferential direction.

The first input shaft friction plate W1 is a ring-shaped member that is formed in a conical plate shape and has a predetermined length in the axial direction of the input shaft 1. The first input shaft friction plate W1 is formed to increase in diameter gradually from a hub W5 side end surface toward an opposite side end surface to the hub W5, while an inner peripheral surface and an outer peripheral surface of the first input shaft friction plate W1 are formed to incline relative to the axial direction of the input shaft 1. Holding pieces W11 that engage with the respective holding holes W54 in the hub W5 are formed in one end of the first input shaft friction plate W1 at intervals in the circumferential direction. When the holding pieces W11 of the first input shaft friction plate W1 are engaged with the holding holes W54 in the hub W5, the first input shaft friction plate W1 rotates integrally with the hub W5 so as to rotate integrally with the first input shaft 1x.

The shaft end 1ya of the second input shaft 1y is formed to be hollow, and a flange 21 is formed on an outer peripheral surface thereof. Holding grooves 22 are formed in the flange 21 at intervals in the circumferential direction. Holding pieces W21 formed on the second input shaft friction plate W2, to be described below, are engaged with the holding grooves 22. A ring-shaped friction surface 23 is formed on the shaft end 1ya of the second input shaft 1y to extend to the hub W5 side. An incline angle of an outer peripheral surface of the friction surface 23 matches an incline angle of an inner peripheral surface of the first input shaft friction plate W1 such that the outer peripheral surface of the friction surface 23 contacts the inner peripheral surface of the first input shaft friction plate W1 substantially evenly.

The second input shaft friction plate W2 is a ring-shaped member that is formed in a conical plate shape and has a predetermined length in the axial direction of the input shaft 1. The second input shaft friction plate W2 is formed to decrease in diameter gradually from a flange 21 side end surface toward the hub W5 side end surface, while an inner peripheral surface and an outer peripheral surface of the second input shaft friction plate W2 are formed to incline relative to the axial direction of the input shaft 1. The holding pieces W21 which engage with the respective holding grooves 22 in the second input shaft 1y are formed on one end of the second input shaft friction plate W2 at intervals in the circumferential direction. When the holding pieces W21 of the second input shaft friction plate W2 are engaged with the holding grooves 22 in the second input shaft 1y, the second input shaft friction plate W2 rotates integrally with the second input shaft 1y.

The first input shaft friction plate W1 and the second input shaft friction plate W2 are pressed against each other by the elastic member W3. The elastic member W3 has the conical plate spring W31 interposed between the retainer W4 and the hub W5. A flange 24 is formed on an inner peripheral surface of the shaft end 1ya of the second input shaft 1y, and a washer W6 contacts the flange 24. When the washer W6 is pressed toward the plate spring W31 side by a lid member W7 that is screwed to a screw formed in the small diameter shaft 1xa, the plate spring W31 deflects such that the first input shaft friction plate W1 and the second input shaft friction plate W2 are pressed against each other. Simultaneously, the inner peripheral surface of the first input shaft friction plate W1 is pressed against the friction surface 23 of the second input shaft, and the outer peripheral surface of the second input shaft friction plate W2 is pressed against the friction surface W53 of the first input shaft.

Accordingly, the plate spring W31 deflects by a predetermined amount, thereby generating a set load. As a result, the damping mechanism W exhibits the function for causing the first input shaft 1x and the second input shaft 1y to rotate integrally when the torque generated in the first input shaft 1x or the second input shaft 1y is smaller than the predetermined torque, and causing the first input shaft 1x and the second input shaft 1y to rotate relatively when the torque equals or exceeds the predetermined torque. The predetermined torque can be adjusted by modifying a plate thickness of the washer W6 or modifying the plate spring W31 itself. The damping mechanism W is constituted by a so-called friction cone clutch. Note that in FIG. 5, coarsely shaded constituent elements denote components that rotate integrally with the first input shaft 1x, excluding the bearing B, while finely shaded constituent elements denote components that rotate integrally with the second input shaft 1y.

(Upshifts)

Figure 6:
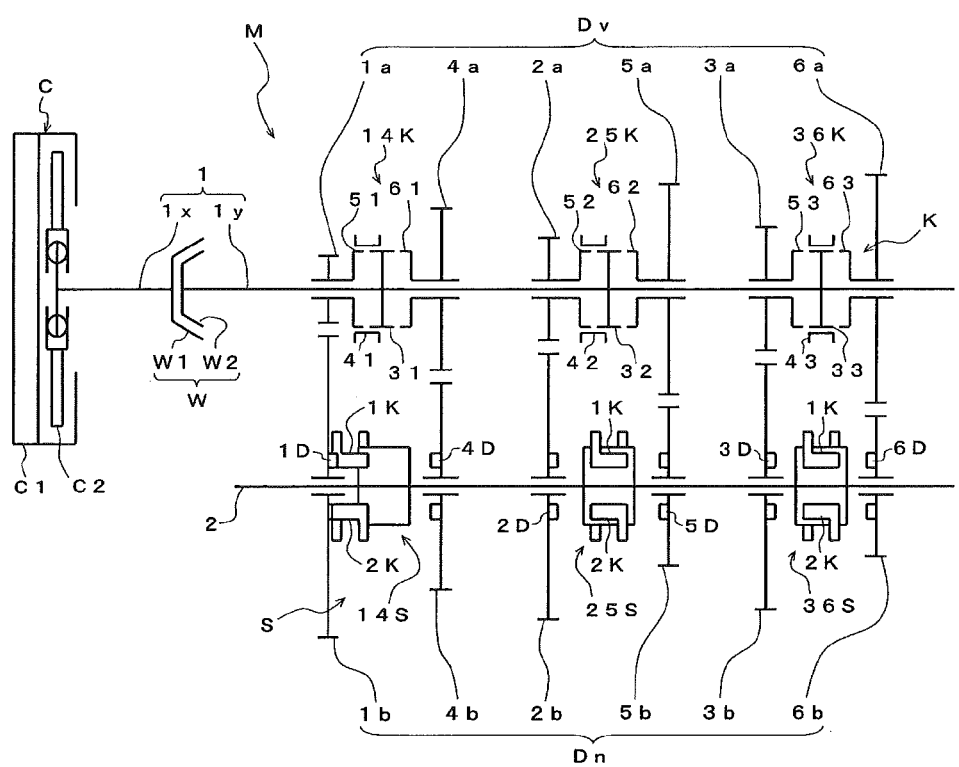
FIG. 6 is an illustrative view showing the transmission at a first gear is selected.

FIG. 6 shows the transmission M when the first gear is selected. When the vehicle is started in the first gear, the sleeve 41 of the first and fourth gear engagement mechanism 14K is moved to the first speed drive gear 1a with the startup clutch C in a disengaged condition such that the sleeve 41 is suspended between the hub 31 and the hub 51 and the first speed drive gear 1a rotates integrally with the second input shaft 1y. Further, in preparation for a subsequent upshift to a second gear, the sleeve 42 of the second and fifth gear engagement mechanism 25K is moved to the second speed drive gear 2a such that the sleeve 42 is suspended between the hub 32 and the hub 52 and the second speed drive gear 2a rotates integrally with the second input shaft 1y. The first key 1K and the second key 2K of the first and fourth gear selector mechanism 14S are then moved to the first speed driven gear 1b with the startup clutch C in a disengaged condition. Next, half clutch control is performed on the startup clutch C, whereby the vehicle is started in the first gear. At this time, the first key 1K engages with the dog 1D of the first speed driven gear 1b so as to perform torque transmission, while the second key enters a coasting condition not engaged with the dog 1D of the first speed driven gear 1b.

Figure 7:
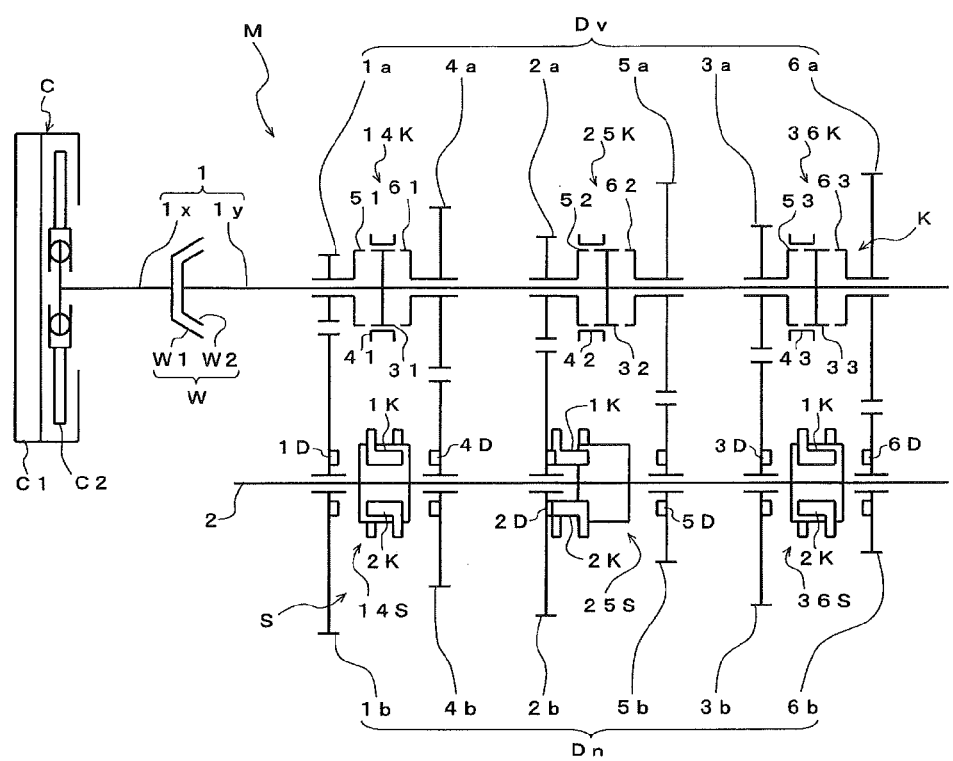
FIG. 7 is an illustrative view showing the transmission at a second gear is selected.

FIG. 7 shows the transmission M when the second gear is selected. When the vehicle is accelerated such that an upshift is performed from the first gear to the second gear, the first key 1K and the second key 2K of the second and fifth gear selector mechanism 25S are moved to the second speed driven gear 2b while the startup clutch C remains connected. As a result, the first key 1K engages with the dog 2D of the second speed driven gear 2b. Immediately after the first key 1K of the second and fifth gear selector mechanism 25S engages with the dog 2D of the second speed driven gear 2b (i.e. immediately after the upshift), an engine rotation speed (rpm) decreases in accordance with a gear ratio between the first gear and the second gear, and therefore the first key 1K of the first and fourth gear selector mechanism 14S enters a coasting condition. Accordingly, the first key 1K and the second key 2K of the first and fourth gear selector mechanism 14S are moved to neutral positions. As a result, the upshift from the first gear to the second gear can be achieved without torque interruption. During the upshift, spike torque is generated by a rotation speed difference between the first speed driven gear 1b and the second speed driven gear 2b at the moment of engagement between the first key 1K of the second and fifth gear selector mechanism 25S and the dog 2D of the second speed driven gear 2b, but the spike torque is absorbed and dampened by the damping mechanism W interposed between the second input shaft 1y and the first input shaft 1x. Further, in preparation for a subsequent upshift to the third gear, the sleeve 43 of the third and sixth gear engagement mechanism 36K is moved to the third speed drive gear 3a side such that the sleeve 43 is suspended between the hub 33 and the hub 53 and the third speed drive gear 3a rotates integrally with the second input shaft 1y.

Figure 8:
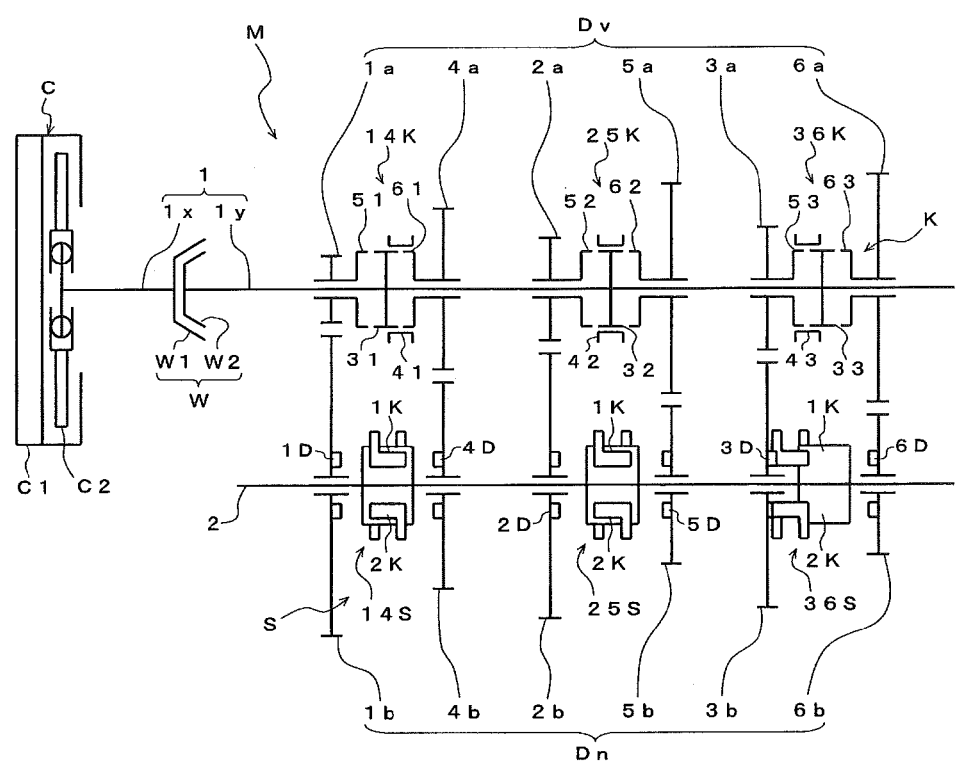
FIG. 8 is an illustrative view showing the transmission at a third gear is selected.

FIG. 8 shows the transmission M when the third gear is selected. When the vehicle is accelerated such that an upshift is performed from the second gear to the third gear, the first key 1K and the second key 2K of the third and sixth gear selector mechanism 36S are moved to the third speed driven gear 3b while the startup clutch C remains connected. As a result, the first key 1K engages with the dog 3D of the third speed driven gear 3b. Immediately after the first key 1K of the third and sixth gear selector mechanism 36S engages with the dog 3D of the third speed driven gear 3b (i.e. immediately after the upshift), the engine rotation speed decreases, and therefore the first key 1K of the second and fifth gear selector mechanism 25S enters the coasting condition. Accordingly, the first key 1K and the second key 2K of the second and fifth gear selector mechanism 25S are moved to neutral positions. As a result, the upshift from the second gear to the third gear can be achieved without torque interruption. During the upshift, spike torque is generated by a rotation speed difference between the second speed driven gear 2b and the third speed driven gear 3b at the moment of engagement between the first key 1K of the third and sixth gear selector mechanism 36S and the dog 3D of the third speed driven gear 3b, but the spike torque is absorbed and dampened by the damping mechanism W. Further, in preparation for a subsequent upshift to the fourth gear, the sleeve 41 of the first and fourth gear engagement mechanism 14K is moved to the fourth speed drive gear 4a side such that the fourth speed drive gear 4a rotates integrally with the second input shaft 1y.

Figure 9:
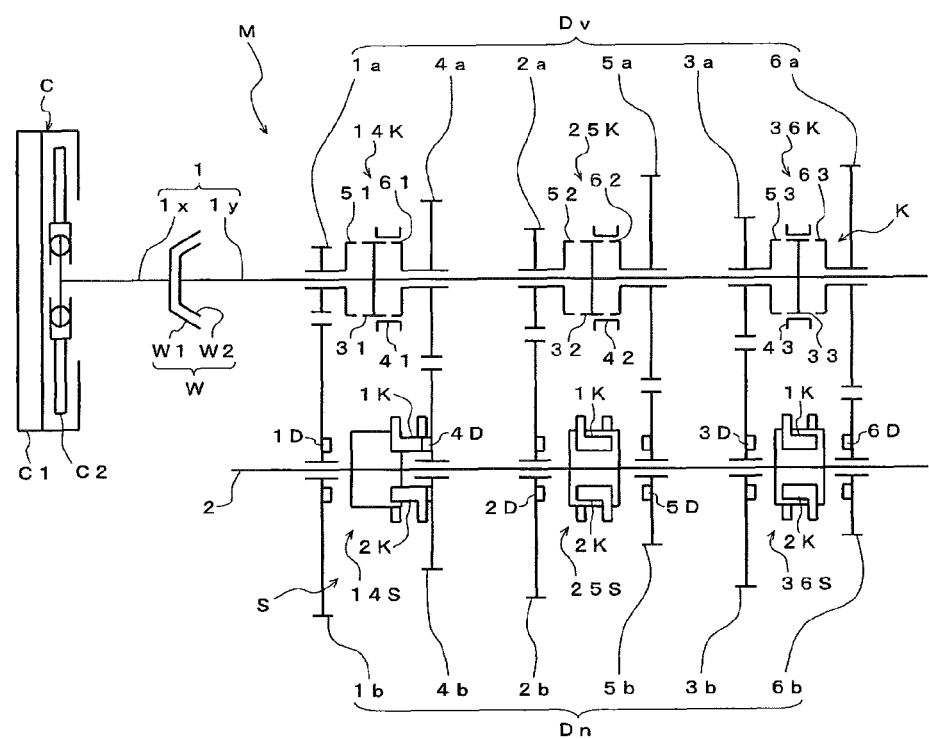
FIG. 9 is an illustrative view showing the transmission at a fourth gear is selected.

FIG. 9 shows the transmission M when the fourth gear is selected. When the vehicle is accelerated such that an upshift is performed from the third gear to the fourth gear, the first key 1K and the second key 2K of the first and fourth gear selector mechanism 14S are moved to the fourth speed driven gear 4b side while the startup clutch C remains connected. As a result, the first key 1K engages with the dog 4D of the fourth speed driven gear 4b. Immediately after the first key 1K of the first and fourth gear selector mechanism 14S engages with the dog 4D of the fourth speed driven gear 4b (i.e. immediately after the upshift), the engine rotation speed decreases, and therefore the first key 1K of the third and sixth gear selector mechanism 36S enters the coasting condition. Accordingly, the first key 1K and the second key 2K of the third and sixth gear selector mechanism 36S are moved to neutral positions. As a result, the upshift from the third gear to the fourth gear can be achieved without torque interruption. During the upshift, spike torque is generated by a rotation speed difference between the third speed driven gear 3b and the fourth speed driven gear 4b at the moment of engagement between the first key 1K of the first and fourth gear selector mechanism 14S and the dog 4D of the fourth speed driven gear 4b, but the spike torque is absorbed and dampened by the damping mechanism W. Further, in preparation for a subsequent upshift to the fifth gear, the sleeve 42 of the second and fifth gear engagement mechanism 25K is moved to the fifth speed drive gear 5a side such that the fifth speed drive gear 5a rotates integrally with the second input shaft 1y.

Figure 10:
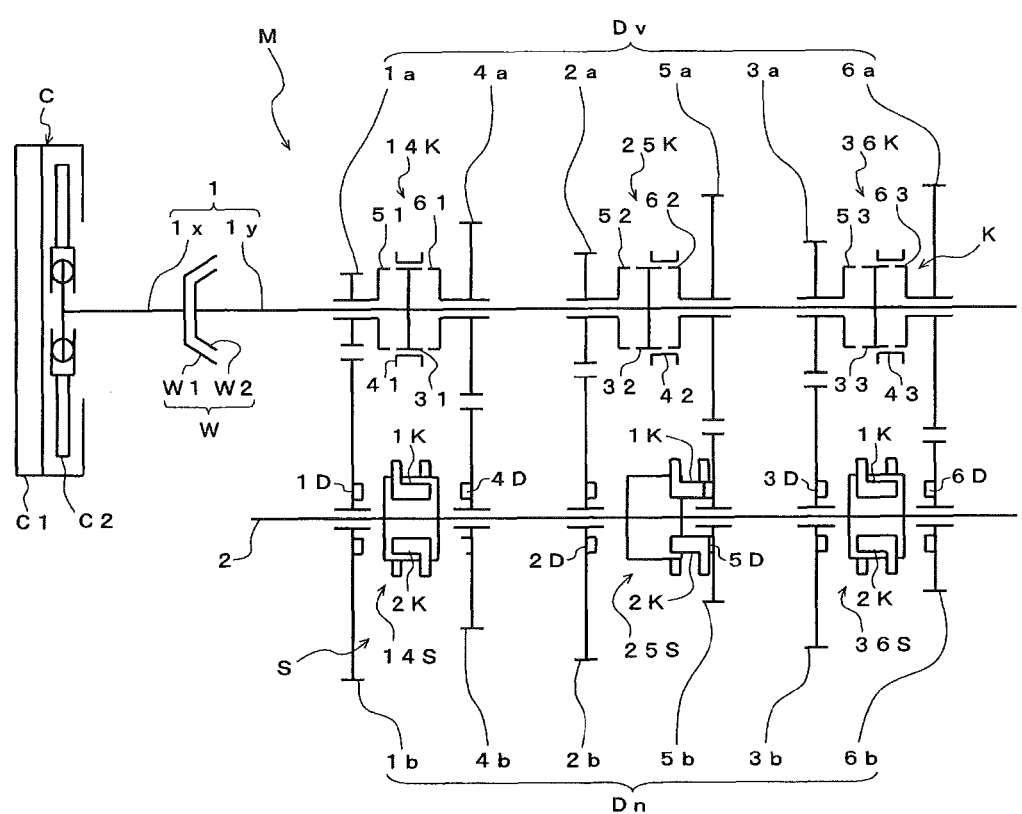
FIG. 10 is an illustrative view showing the transmission when a fifth gear is selected.
Figure 11:
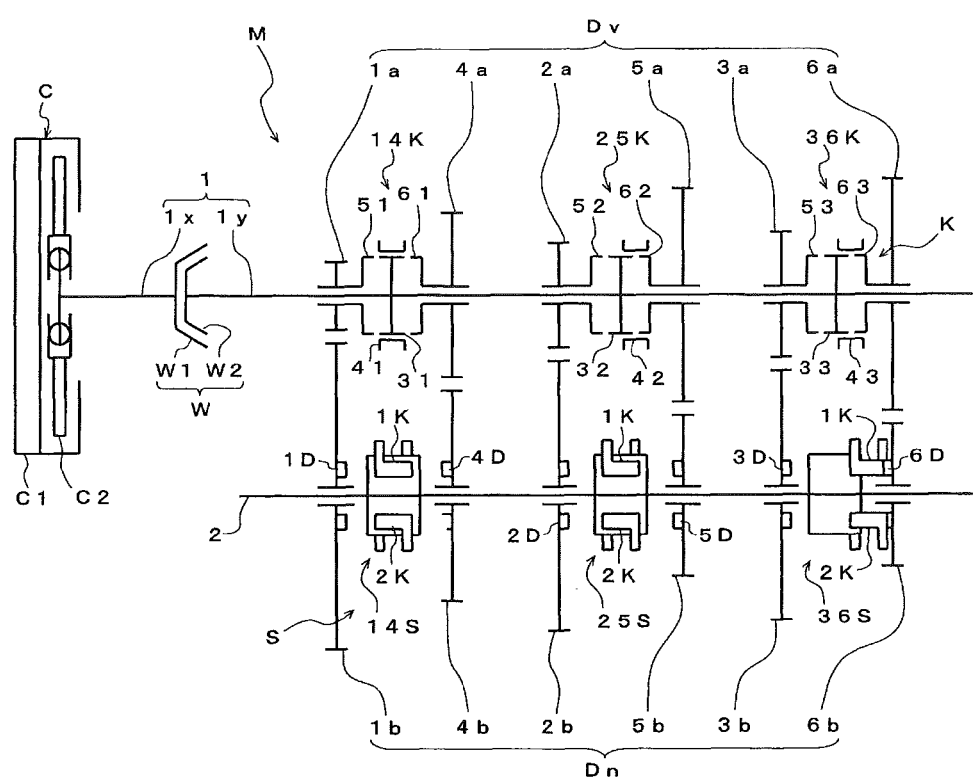
FIG. 11 is an illustrative view showing the transmission when a sixth gear is selected.

Thereafter, upshifts are performed similarly from the fourth gear to the fifth gear and from the fifth speed to the sixth gear. FIG. 10 and FIG. 11 show the transmission M when the fifth gear and the sixth gear are respectively selected. The spike torque generated during the upshifts to the respective gears is absorbed by the damping mechanism W.

(Downshifts)

Downshifts are performed using reverse procedures to the upshifts. More specifically, when the vehicle decelerates such that a downshift is performed from the sixth gear to the fifth gear, as shown in FIG. 10, the first key 1K and the second key 2K of the second and fifth gear selector mechanism 25S are moved to the fifth speed driven gear 5b while the startup clutch C remains connected. As a result, the second key 2K engages with the dog 5D of the fifth speed driven gear 5b. Immediately after the second key 2K of the second and fifth gear selector mechanism 25S engages with the dog 5D of the fifth speed driven gear 5b (i.e. immediately after the downshift), the engine rotation speed increases in accordance with a gear ratio between the sixth gear and the fifth gear, and therefore the first key 1K of the third and sixth gear selector mechanism 36S enters the coasting condition. Accordingly, the first key 1K and the second key 2K of the third and sixth gear selector mechanism 36S are moved to neutral positions. As a result, the downshift from the sixth gear to the fifth gear can be achieved without torque interruption. During the downshift, spike torque is generated by a rotation speed difference between the sixth speed driven gear 6b and the fifth speed driven gear 5b at the moment of engagement between the second key 2K of the second and fifth gear selector mechanism 25S and the dog 5D of the fifth speed driven gear 5b, but the spike torque is absorbed and dampened by the damping mechanism W. Further, in preparation for a subsequent downshift to the fourth gear, the sleeve 41 of the first and fourth gear engagement mechanism 14K is moved to the fourth speed drive gear 4a side such that the fourth speed drive gear 4a rotates integrally with the second input shaft 1y.

Thereafter, downshifts are performed similarly from the fifth gear to the fourth gear, from the fourth gear to the third gear, from the third gear to the second gear, and from the second gear to the first gear. The spike torque generated during the downshifts to the respective gears is absorbed by the damping mechanism W.

(Actions/Effects)

In the transmission M according to this embodiment, as described above, the drive gears Dv (the first speed drive gear 1a, second speed drive gear 2a, third speed drive gear 3a, fourth speed drive gear 4a, fifth speed drive gear 5a, and sixth speed drive gear 6a) are attached to the input shaft 1 so as to freely rotate, and the driven gears Dn (the first speed driven gear 1b, second speed driven gear 2b, third speed driven gear 3b, fourth speed driven gear 4b, fifth speed driven gear 5b, and sixth speed driven gear 6b) which mesh respectively with the drive gears Dv are attached to the output shaft 2 so as to freely rotate. Before a gear shift, only a drive gear Dv to be used in the gear shift is fixed to the input shaft 1 to be incapable of relative rotation by the engagement mechanism K, whereas the drive gears Dv not related to the gear shift are uncoupled from the rotation of the input shaft 1. The gear shift is then performed by fixing the driven gear Dn in the corresponding gear position to the output shaft 2 using the selector mechanism S.

For example, during a gear shift from the first gear to the second gear, as shown in FIG. 7, the drive gear Dv (the second speed drive gear 2a) to be used in the gear shift is fixed to the input shaft 1 by the engagement mechanism K (the second and fifth gear engagement mechanism 25K), and in this condition, the driven gear Dn (the second speed driven gear 2b) in the corresponding gear position, which meshes with the drive gear Dv (the second speed drive gear 2a), is fixed to the output shaft 2 to be incapable of relative rotation by the selector mechanism S (the second and fifth gear selector mechanism 25S). At this time, only the second speed drive gear 2a, the third speed drive gear 3a which is fixed to the input shaft 1 by the third and sixth gear engagement mechanism 36K in preparation for the upshift to be performed to the third gear without torque interruption, and the third speed driven gear 3b which meshes with the third speed drive gear 3a co-rotate with the second speed driven gear 2b which receives the spike torque generated by the operation of the second and fifth gear selector mechanism 25S, and all other gears are uncoupled from the rotation. Note that when a downshift from the second gear to the gear speed is predicted instead of an upshift from the second gear to the third gear on the basis of operating conditions of the vehicle and the engine, the first speed drive gear 1a is fixed to the input shaft 1 by the first and fourth gear engagement mechanism 14K in preparation for the downshift to be performed to the first gear without torque interruption instead of fixing the third speed drive gear 3a to the input shaft 1. Hence, during a gear shift to the second gear, only the gears related to the gear shift (the gear serving as the direct destination of the gear shift and the destination gear of the gear shift to the next speed) co-rotate while the gears not related to the hear shift are uncoupled from the rotation. During a gear shift to the second gear, therefore, the number of gears that co-rotate with the gear of the corresponding gear position and inertia therein can be minimized, and as a result, the spike torque generated during the gear shift can be suppressed to a minimum.

The process described above applies similarly to gear shifts to the respective gear positions. Hence, in all gear positions, a gear shift can be performed by fixing the gear of the corresponding gear position to the output shaft 2 in a condition where only the gears related to the gear shift co-rotate and the gears not related to the gear shift are uncoupled from the rotation. During gear shifts to the respective gear positions, therefore, the number of gears that co-rotate with the gear of the corresponding gear position and the inertia therein can be minimized, and as a result, the spike torque generated during gear shifts to the respective gear positions can be suppressed to a minimum.

The spike torque generated during gear shifts to the respective gear positions is absorbed and dampened by the damping mechanism W interposed between the first input shaft 1x and the second input shaft 1y. The damping mechanism W is interposed between the first input shaft 1x, to which the startup clutch C is connected, and the second input shaft 1y, to which the drive gears Dv that receive the spike torque generated during gear shifts to the respective gear positions are respectively attached, and is therefore used in common to absorb the spike torque generated during gear shifts to the respective gear positions. As a result, a cost reduction can be achieved in comparison with a case where the damping mechanism W is provided for each gear.

Hence, with the transmission M according to this embodiment, which is a so-called dog type transmission that performs gear shifts without torque interruption, the number of gears that co-rotate with the gear of the corresponding gear position and the inertia therein can be minimized during a gear shift, enabling a reduction in spike torque, and as a result, a cost reduction can be achieved while maintaining a sufficient function for dampening the spike torque generated during the gear shift.

Modified Embodiment

Figure 12:
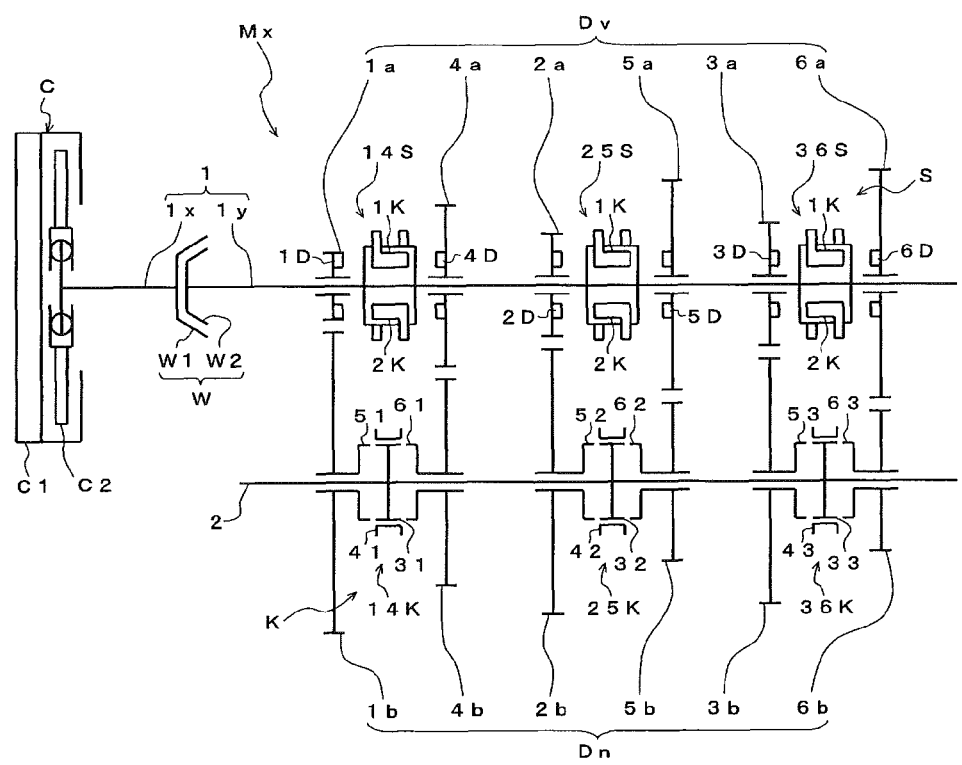
FIG. 12 is a pattern diagram showing when transmission for an automobile according to a modified embodiment of the present invention.

FIG. 12 shows a transmission Mx for a vehicle according to a modified embodiment of the present invention in pattern form. In the transmission Mx, the engagement mechanism K and the selector mechanism S are disposed in reverse relative to the transmission M according to the previous embodiment shown in FIG. 1. More specifically, the engagement mechanism K is provided on the output shaft 2 and the selector mechanism S is provided on the input shaft 1. Apart from disposing the engagement mechanism K and the selector mechanism S in reverse, the transmission Mx is configured similarly and exhibits similar actions and effects to the transmission M according to the previous embodiment. Therefore, identical constituent elements have been allocated identical reference symbols, and description thereof has been omitted. Further, the selector mechanisms 14S, 25S and 36S may be provided separately (alternately, for example) on the input shaft 1 and the output shaft 2, and the engagement mechanisms 14K, 25K and 36K which form pairs therewith may likewise be disposed separately on the input shaft 1 and the output shaft 2. This transmission also delivers similar actions and effects to those of the first embodiment.

The present invention is not limited to the above-described embodiments, and permits various modifications and alterations within the technical scope of the invention. For example, the selector mechanism S is not limited to the configuration described above, and a known conventional selector mechanism may also be used.

The present invention can be used mainly as a transmission for a vehicle.

What is claimed is:

1. A transmission, comprising:
    an input shaft to receive a rotation of an engine;
    drive gears respectively attached to the input shaft to freely rotate individually;
    an output shaft disposed parallel to the input shaft in order to output rotation following a gear shift;
    driven gears respectively attached to the output shaft to freely rotate individually and to mesh with the drive gears;
    an engagement mechanism to fix a drive gear to be used in a gear shift individually, from among the drive gears, to the input shaft to be incapable of relative rotation; and
    a selector mechanism to fix, during the gear shift, a driven gear of a corresponding gear position individually, which meshes with the drive gear fixed to the input shaft by the engagement mechanism, to the output shaft to be incapable of the relative rotation;
    a hub that is fixed to the input shaft between adjacent gears from among the drive gears attached to the input shaft so as to freely rotate; and
    a sleeve that is held by the hub to freely move in an axial direction of the input shaft, whereby the sleeve engages with one of the adjacent gears when moved to one side in the axial direction and engages with an other adjacent gear when moved to another side in the axial direction, wherein the drive gears are arranged on the input shaft such that adjacent gears are separated by at least two gear positions.

2. The transmission according to claim 1, wherein the selector mechanism includes:
    dogs that project respectively from opposing surfaces of the adjacent gears from among the driven gears attached to the output shaft so as to freely rotate;
    a hub fixed to the output shaft between the adjacent gears;
    a first key which is held on the hub so as to freely move in an axial direction of the output shaft, one end of which is configured to be engaged with a leading surface of the dog projecting from said one of the adjacent gears and another end of which is configured to be engaged with a trailing surface of the dog projecting from the other adjacent gear;
    a second key which is held on the hub so as to freely move in the axial direction of the output shaft, one end of which is configured to be engaged with the trailing surface of the dog projecting from one of the adjacent gears and another end of which is configured to be engaged with the leading surface of the dog projecting from the other adjacent gear; and
    an actuator for moving the first key and the second key in the axial direction of the output shaft.

3. A transmission, comprising:
    an input shaft to receive a rotation of an engine;
    drive gears respectively attached to the input shaft to freely rotate individually;
    an output shaft disposed parallel to the input shaft in order to output rotation following a gear shift;
    driven gears that are respectively attached to the output shaft to freely rotate individually and to mesh with the drive gears;
    an engagement mechanism to fix a drive gear to be used in a gear shift individually, from among the driven gears, to the output shaft to be incapable of relative rotation;
    a selector mechanism to fix, during the gear shift, a drive gear of a corresponding gear position individually, which meshes with the driven gear fixed to the output shaft by the engagement mechanism, to the input shaft to be incapable of the relative rotation;
    a hub that is fixed to the input shaft between adjacent gears from among the drive gears attached to the input shaft so as to freely rotate; and
    a sleeve that is held by the hub to freely move in an axial direction of the output shaft, whereby the sleeve engages with one of the adjacent gears when moved to one side in the axial direction and engages with an other adjacent gear when moved to another side in the axial direction, wherein the drive gears are arranged on the output shaft such that adjacent gears are separated by at least two gear positions.

4. The transmission according to claim 3, wherein the selector mechanism includes:
    dogs that project respectively from opposing surfaces of the adjacent gears from among the drive gears attached to the input shaft so as to freely rotate;
    a hub fixed to the input shaft between the adjacent gears;
    a first key which is held on the hub so as to freely move in an axial direction of the input shaft, one end of which is configured to be engaged with a leading surface of the dog projecting from one of the adjacent gears and another end of which is configured to be engaged with a trailing surface of the dog projecting from the other adjacent gear;
a second key which is held on the hub so as to freely move in the axial direction of the input shaft, one end of which is configured to be engaged with the trailing surface of the dog projecting from one of the adjacent gears and another end of which is configured to be engaged with the leading surface of the dog projecting from the other adjacent gear; and
an actuator for moving the first key and the second key in the axial direction of the input shaft.

5. The transmission according to claim 2, wherein key grooves extending in the axial direction are formed in an outer peripheral surface of the hub at intervals in a circumferential direction, and
wherein the first key and the second key are held in the key grooves alternately in the circumferential direction.

6. The transmission according to claim 4, wherein key grooves extending in the axial direction are formed in an outer peripheral surface of the hub at intervals in a circumferential direction, and
wherein the first key and the second key are held in the key grooves alternately in the circumferential direction.

7. The transmission according to claim 1, further comprising:
a startup clutch interposed between the engine and the input shaft,
wherein the input shaft is divided in the axial direction into a first input shaft on a startup clutch side and a second input shaft to which the drive gears are attached so as to freely rotate, and
wherein a damping mechanism that causes the first input shaft and the second input shaft to rotate integrally when a torque generated in either one of the first input shaft and the second input shaft is smaller than a predetermined torque and causes the first input shaft and the second input shaft to rotate relatively when the torque equals or exceeds the predetermined torque is interposed between the first input shaft and the second input shaft.

8. The transmission according to claim 3, further comprising:
a startup clutch interposed between the engine and the input shaft,
wherein the input shaft is divided in the axial direction into a first input shaft on a startup clutch side and a second input shaft to which the drive gears are attached so as to freely rotate, and
wherein a damping mechanism that causes the first input shaft and the second input shaft to rotate integrally when a torque generated in either one of the first input shaft and the second input shaft is smaller than a predetermined torque and causes the first input shaft and the second input shaft to rotate relatively when the torque equals or exceeds the predetermined torque is interposed between the first input shaft and the second input shaft.

9. The transmission according to claim 7, wherein the damping mechanism includes:
a first input shaft friction plate that rotates integrally with the first input shaft;
a second input shaft friction plate that is disposed to overlap the first input shaft friction plate and rotates integrally with the second input shaft; and
an elastic member for pressing the second input shaft friction plate against the first input shaft friction plate.

10. The transmission according to claim 8, wherein the damping mechanism includes:
a first input shaft friction plate that rotates integrally with the first input shaft;
a second input shaft friction plate that is disposed to overlap the first input shaft friction plate and rotates integrally with the second input shaft; and
an elastic member for pressing the second input shaft friction plate against the first input shaft friction plate.

11. The transmission according to claim 1, further comprising a damping mechanism that causes a first input shaft of the input shaft on a startup clutch side and a second input shaft of the input shaft to which the drive gears are attached to rotate integrally when a torque generated in one of the first input shaft and the second input shaft is smaller than a predetermined torque,
wherein the predetermined torque is set to larger than a maximum torque that is generated in the first input shaft and the second input shaft when the first input shaft is rotated by the engine and is set to smaller than a spike torque that is generated in the first input shaft and the second input shaft when gears shifts are performed.

12. The transmission according to claim 11, further comprising:
a startup clutch interposed between the engine and the input shaft,
wherein the damping mechanism is interposed between the first input shaft and the second input shaft.

13. The transmission according to claim 12, wherein the input shaft is divided in the axial direction into the first input shaft on the startup clutch side and the second input shaft to which the drive gears are attached so as to freely rotate.

14. The transmission according to claim 12, wherein the damping mechanism causes the first input shaft and the second input shaft to rotate relatively when the torque equals or exceeds the predetermined torque.

15. The transmission according to claim 11, wherein the damping mechanism is interposed between the first input shaft and the second input shaft, and
wherein the input shaft is divided in the axial direction into the first input shaft on the startup clutch side and the second input shaft to which the drive gears are attached so as to freely rotate, and
wherein the damping mechanism causes the first input shaft and the second input shaft to rotate relatively when the torque equals or exceeds the predetermined torque.

16. The transmission according to claim 3, further comprising:
a damping mechanism that causes a first input shaft of the input shaft on a startup clutch side and a second input shaft of the input shaft to which the drive gears are attached to rotate integrally when a torque generated in one of the first input shaft and the second input shaft is smaller than a predetermined torque,
wherein the predetermined torque is set to larger than a maximum torque that is generated in the first input shaft and the second input shaft when the first input shaft is rotated by the engine and is set to smaller than a spike torque that is generated in the first input shaft and the second input shaft when gears shifts are performed.

17. The transmission according to claim 16, further comprising:
a startup clutch interposed between the engine and the input shaft, wherein the damping mechanism is interposed between the first input shaft and the second input shaft.

18. The transmission according to claim 17, wherein the input shaft is divided in the axial direction into the first input shaft on the startup clutch side and the second input shaft to which the drive gears are attached so as to freely rotate.

19. The transmission according to claim 17, wherein the damping mechanism causes the first input shaft and the second input shaft to rotate relatively when the torque equals or exceeds the predetermined torque.

20. The transmission according to claim 16, wherein the damping mechanism is interposed between the first input shaft and the second input shaft, and wherein the input shaft is divided in the axial direction into the first input shaft on the startup clutch side and the second input shaft to which the drive gears are attached so as to freely rotate, and wherein the damping mechanism causes the first input shaft and the second input shaft to rotate relatively when the torque equals or exceeds the predetermined torque.

\* \* \* \* \*